United States Patent [19]
Friend

[11] Patent Number: 5,870,856
[45] Date of Patent: Feb. 16, 1999

[54] FLOWER CONTAINER WITH SELECTABLE PRESENTATION INSERTS

[76] Inventor: Gregory H. Friend, P.O. Box 262, Enumclaw, Wash. 98022

[21] Appl. No.: 839,870

[22] Filed: Apr. 17, 1997

[51] Int. Cl.⁶ .................................................. A01G 9/02
[52] U.S. Cl. ............................... 47/65.7; 47/67; 47/66.6; 47/72
[58] Field of Search ................... 47/66.7, 65.7, 47/35, 66.1, 72, 666, 41, 67; 220/495.05, 543, 544; 206/738, 739, 758

[56] References Cited

U.S. PATENT DOCUMENTS

| D. 392,914 | 3/1998 | Friend | D11/143 |
|---|---|---|---|
| 1,077,423 | 11/1913 | Myers . | |
| 1,334,069 | 3/1920 | Bach et al. . | |
| 1,951,642 | 3/1934 | Augustin et al. | 47/34 |
| 2,702,441 | 2/1955 | Jones | 47/41.1 |
| 3,612,343 | 10/1971 | Phipps | 220/69 |
| 3,812,617 | 5/1974 | Brody | 47/41 |
| 3,943,661 | 3/1976 | DeVito et al. | 47/35 |
| 4,016,676 | 4/1977 | Bennick, Jr. | 47/66 |
| 4,091,928 | 5/1978 | Bernardo | 206/575 |
| 4,211,036 | 7/1980 | Dalitz | 47/66 |
| 4,434,567 | 3/1984 | LeVeau | 40/157 |
| 4,584,213 | 4/1986 | Rentowl | 428/23 |
| 4,639,725 | 1/1987 | Franke | 340/815 |
| 4,739,595 | 4/1988 | Yamagata | 52/134 |
| 4,744,171 | 5/1988 | Hilliard | 47/67 |
| 4,847,741 | 7/1989 | Boettinger | 362/431 |
| 4,901,456 | 2/1990 | Cotutsca | 40/152.1 |
| 4,950,216 | 8/1990 | Weder | 493/162 |
| 5,085,002 | 2/1992 | Lee et al. | 47/41.12 |
| 5,277,307 | 1/1994 | Kelly | 206/45.14 |
| 5,630,512 | 5/1997 | Wells | 206/776 |
| 5,647,168 | 7/1997 | Gilbert | 47/72 |

Primary Examiner—Michael J. Carone
Assistant Examiner—Fredrick T. French, III
Attorney, Agent, or Firm—Kramer & Associates; D. Scott Juneau; Terry Kramer

[57] ABSTRACT

A multiple metal piece easily assembled flower container having selected beautiful metallic, plastic coated, plated, and/or painted surfaces, has an outside picture frame assembly to position selectable presentation inserts serving, for example: as ornamentation, such as surrounding attractive wood lattices; as art work; as literary work; as photography work; and/or as commercial informative work. A top molding has depending portions and a bottom has upturned bottom sides. Surrounding sides are fitted above with the depending portions and the top molding, and below with the upturned bottom sides and the bottom. The selectable presentation inserts are likewise fitted above and below. Vertically arranged moldings are likewise fitted above and below to additionally contain in place within this resulting picture frame assembly, both the selective presentation inserts and the surrounding sides. These vertical moldings are secured to both the top molding and the bottom. Preferably an excess water drain is optionally provided in the bottom, a drip pan is then optionally secured to the bottom to contain the excess water, a wick assembly extends from the bottom down to the drip pan, and an optional hanger suspends the flower container from an overhead structure, when the container is serving as a hanging flower basket.

17 Claims, 19 Drawing Sheets

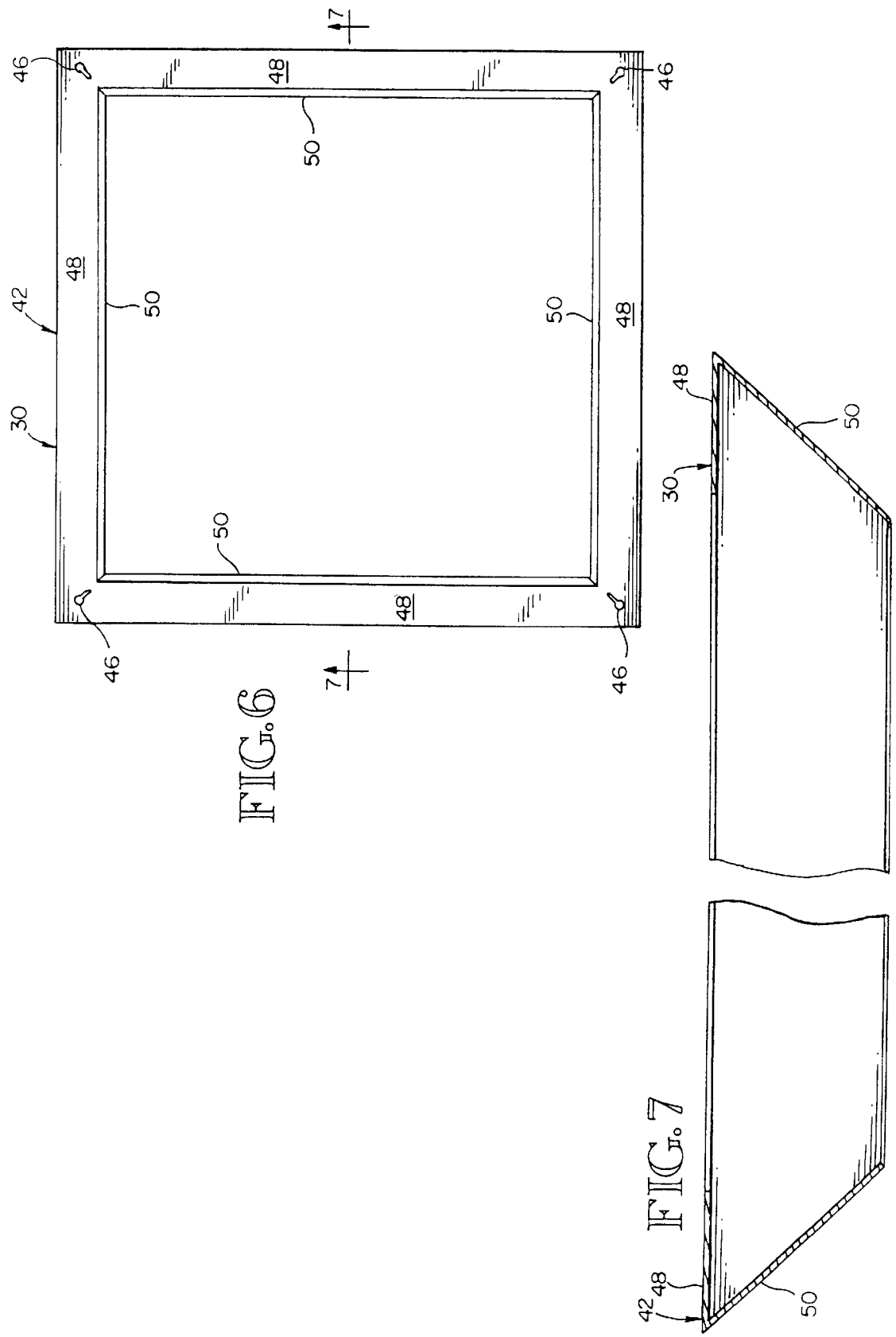

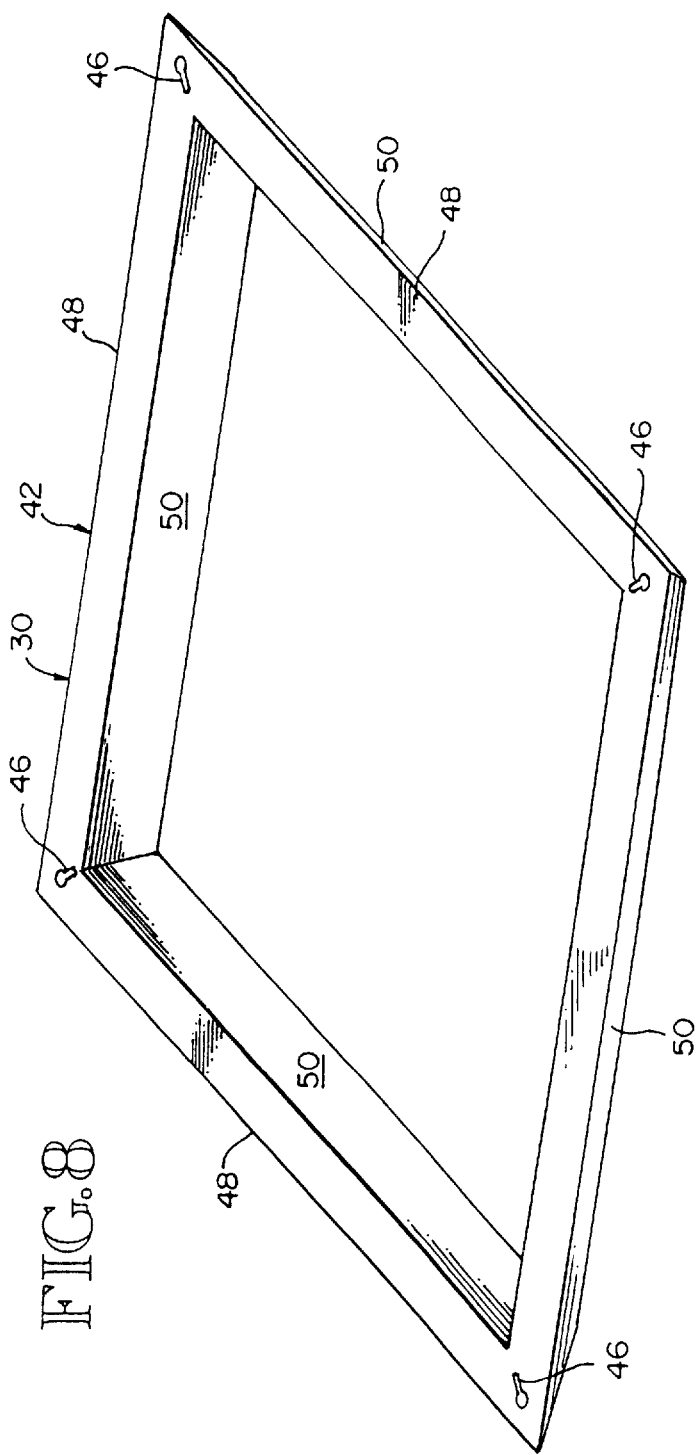

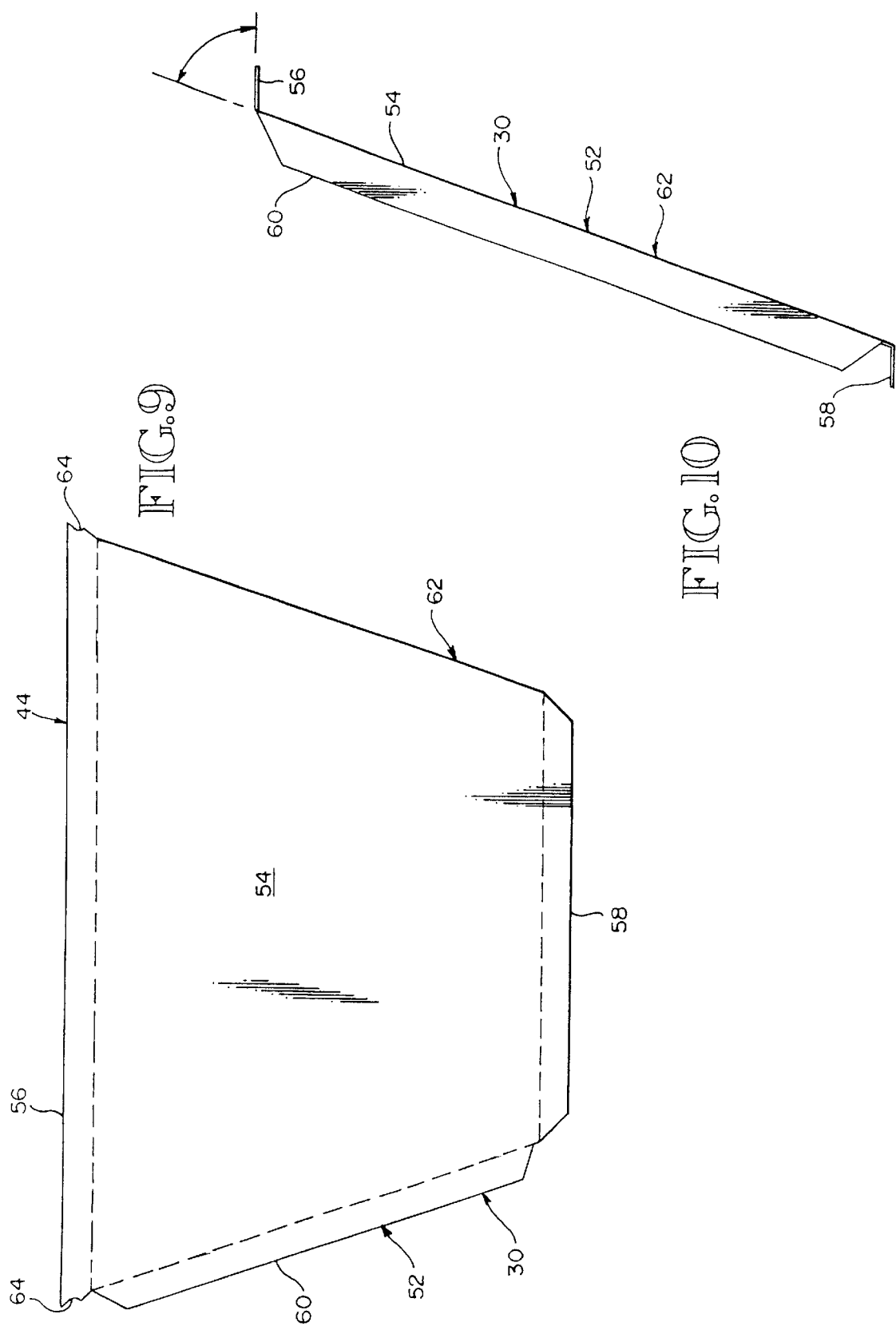

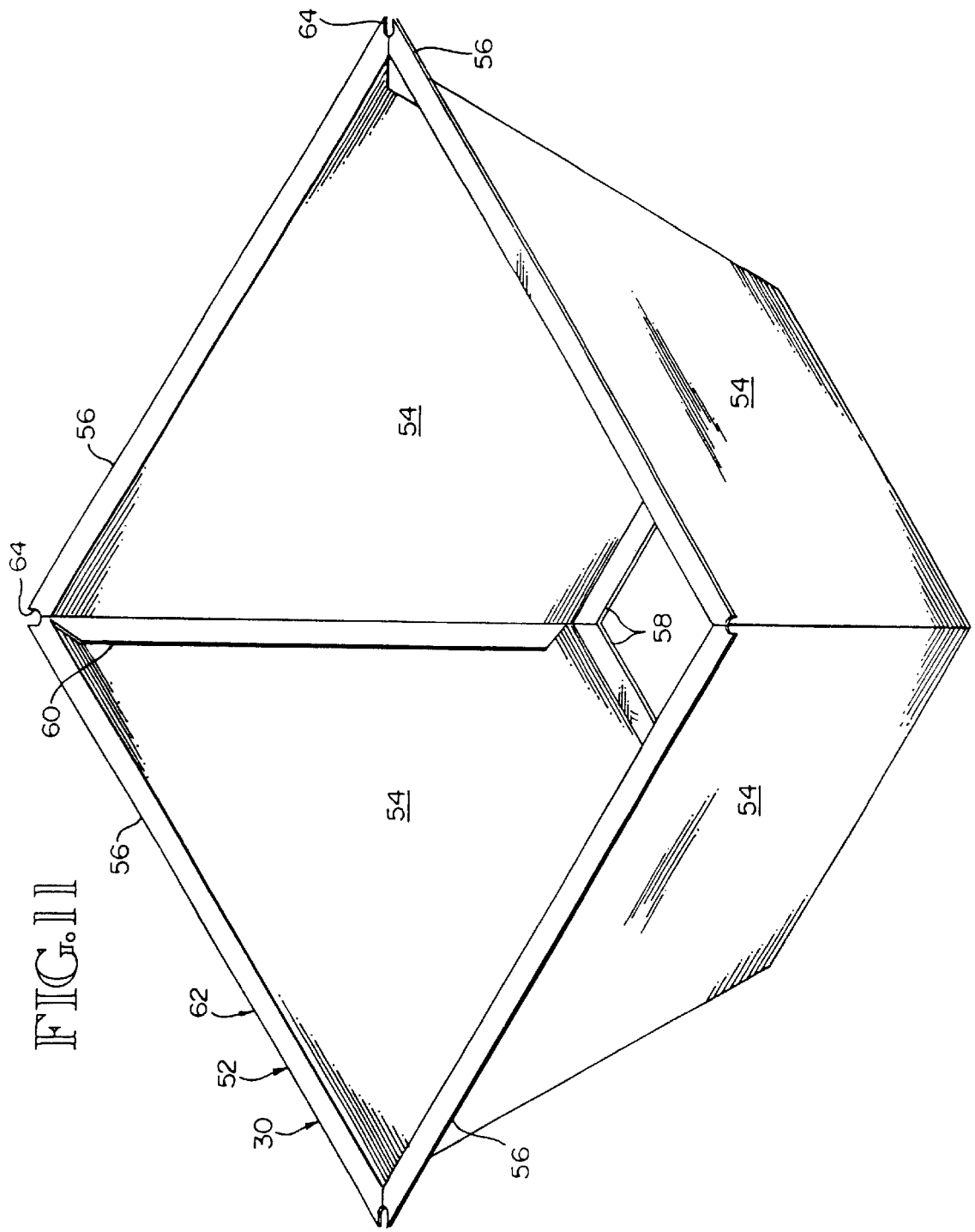

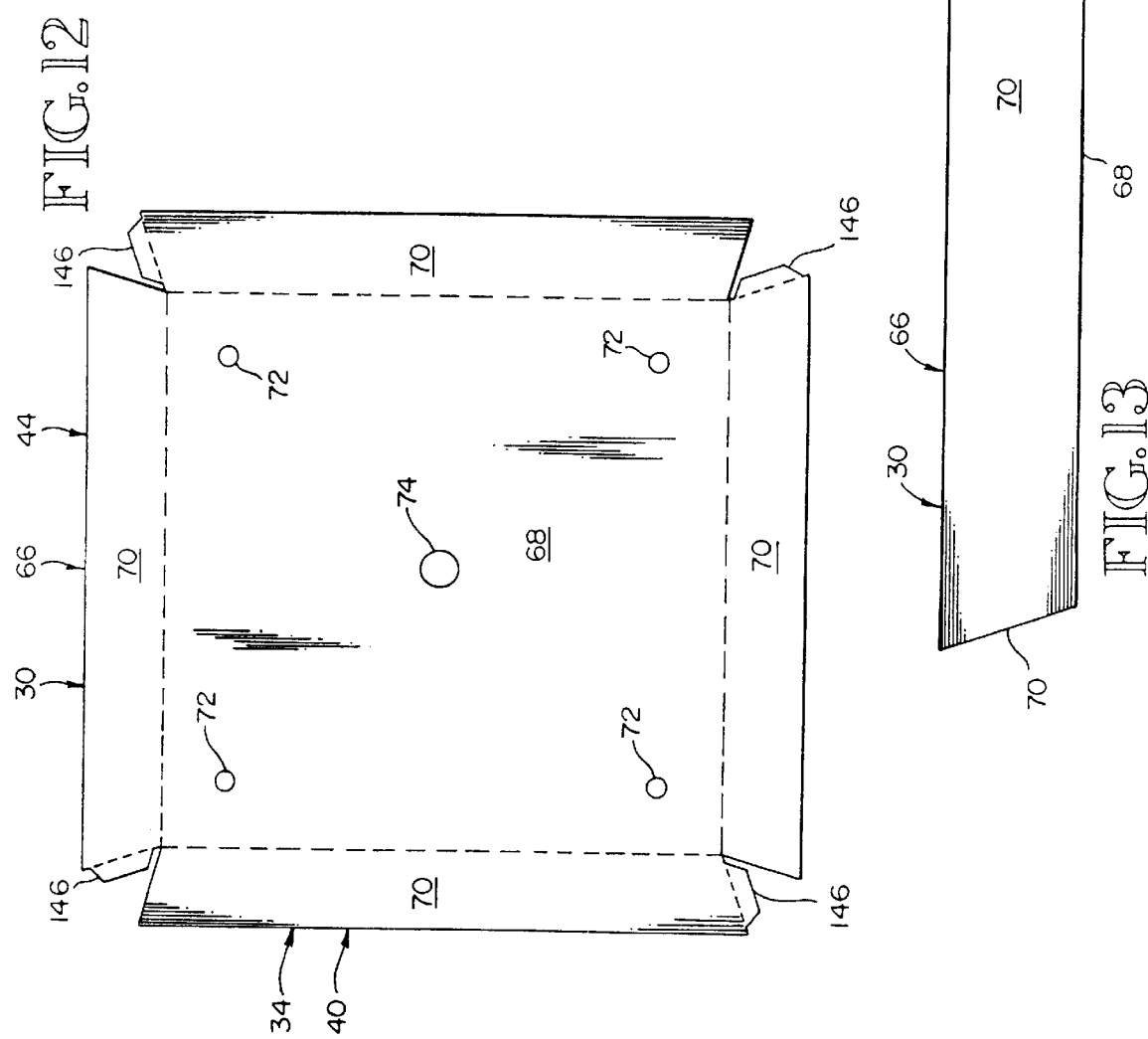

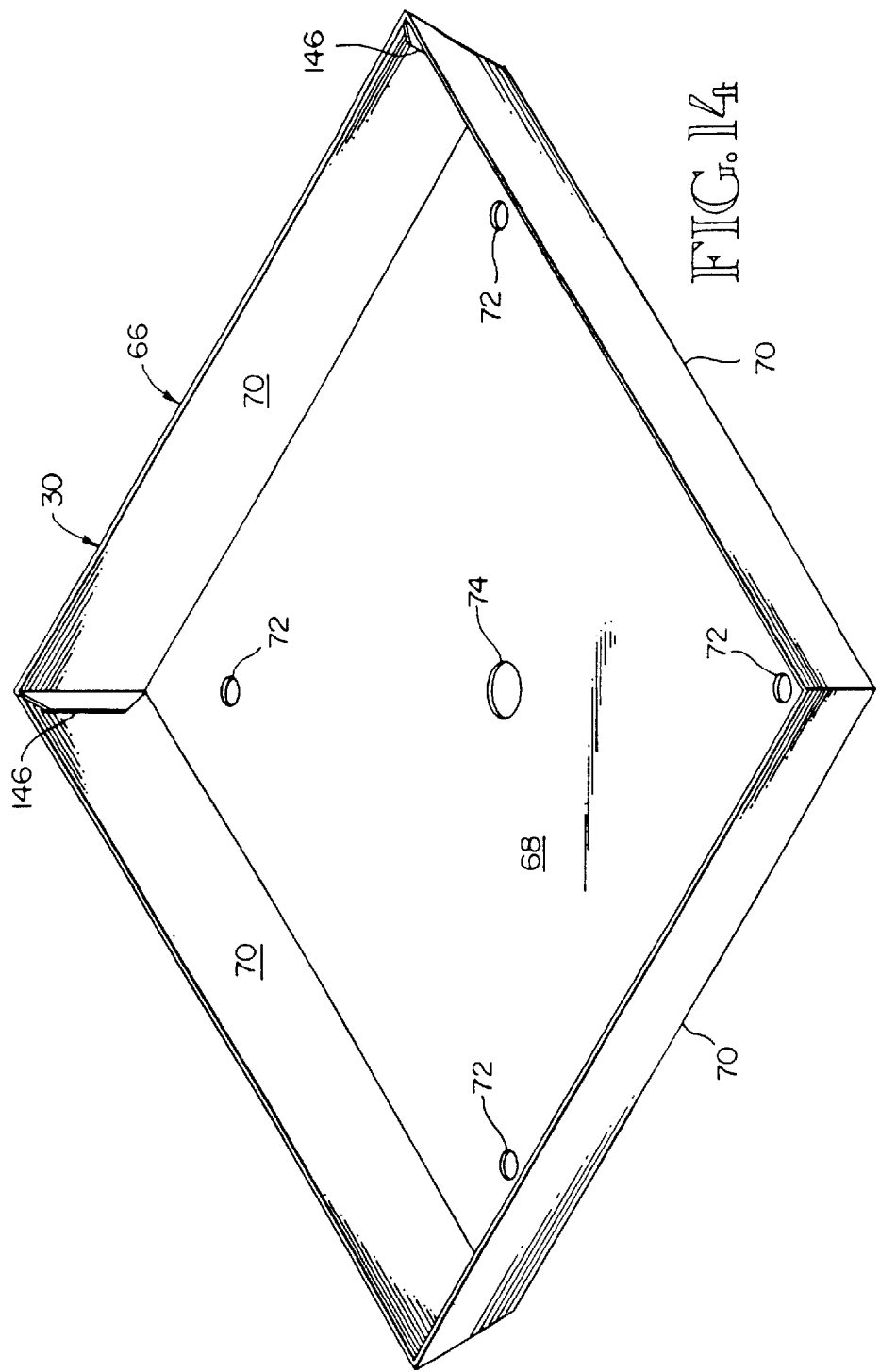

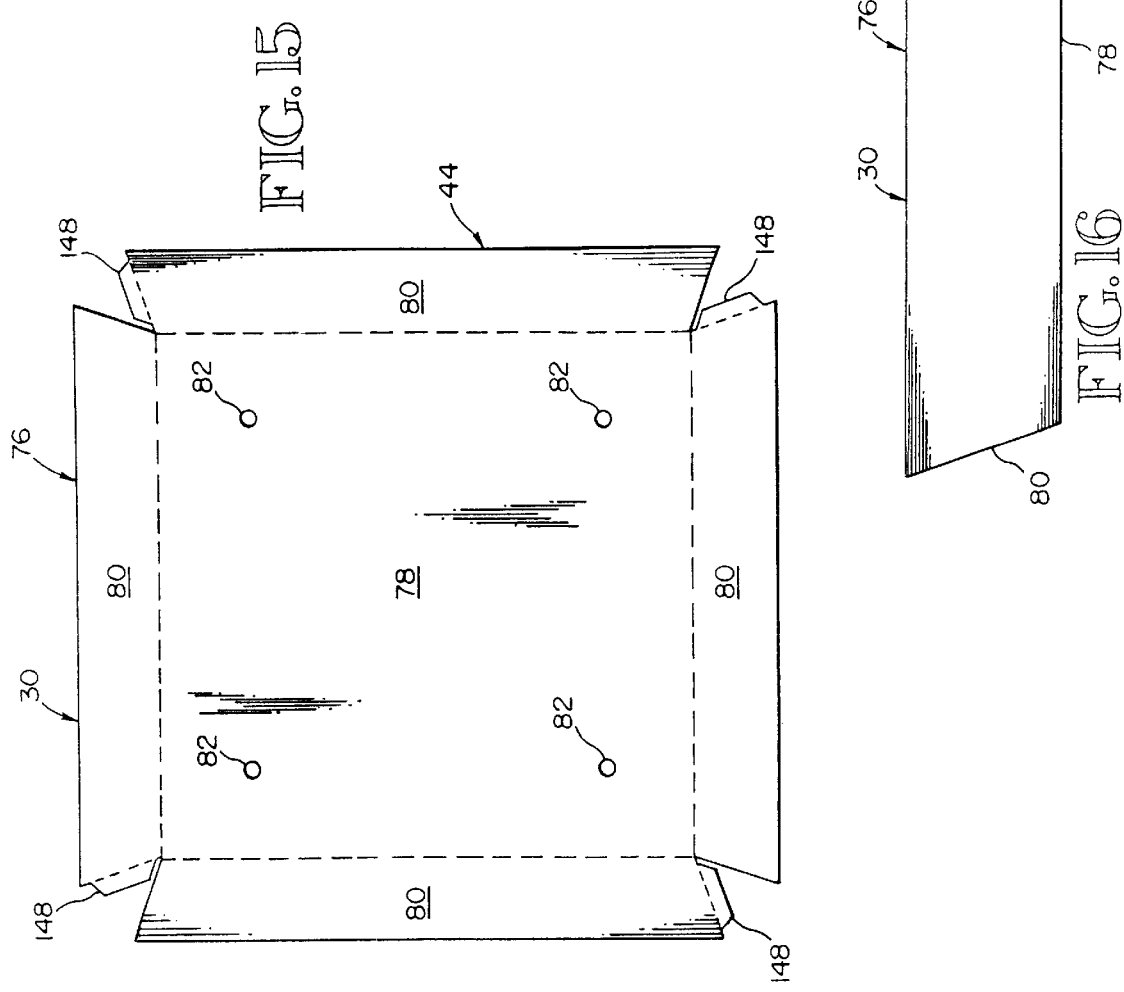

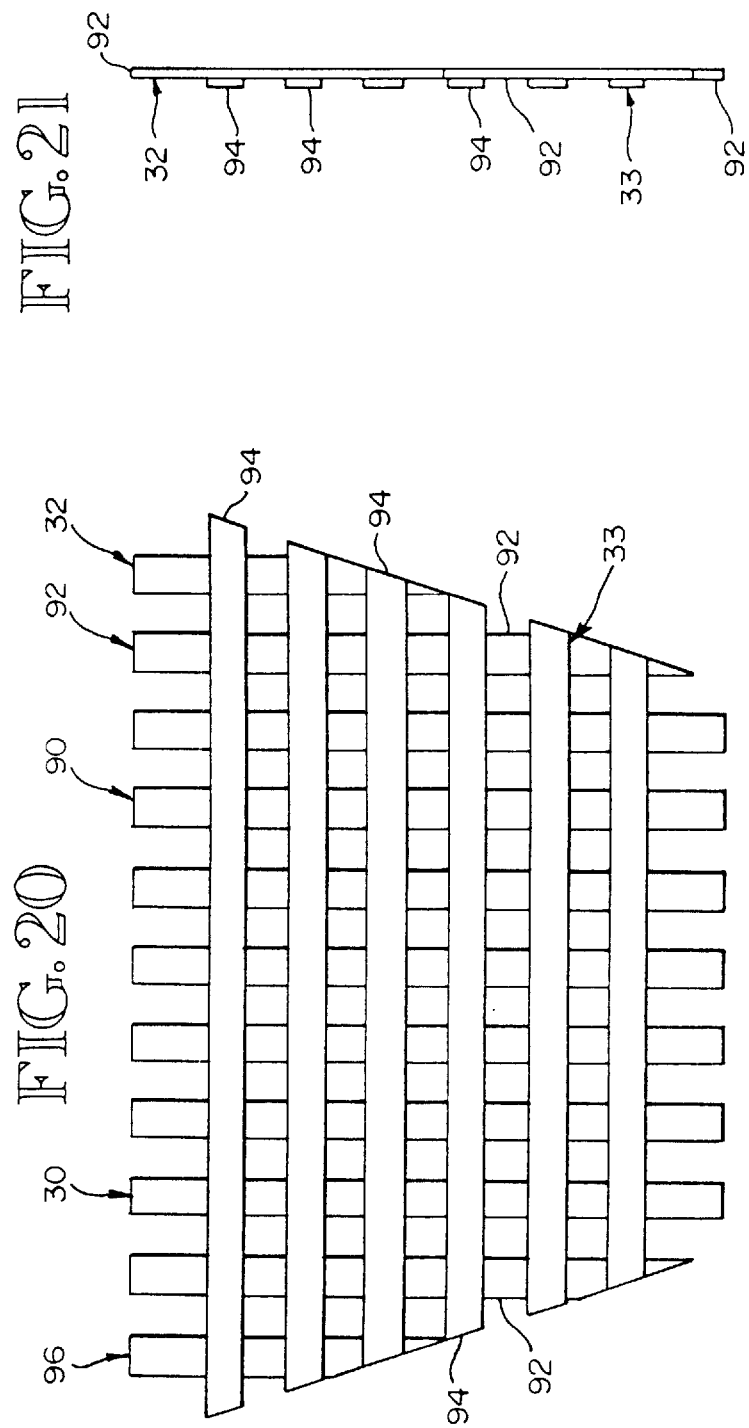

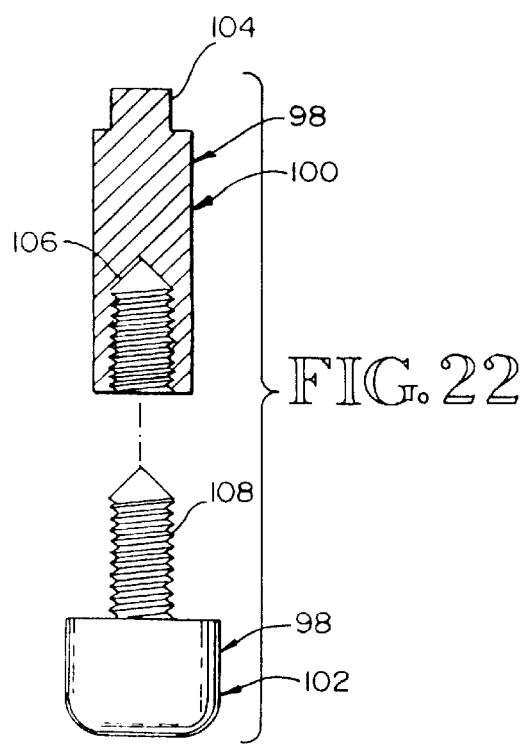
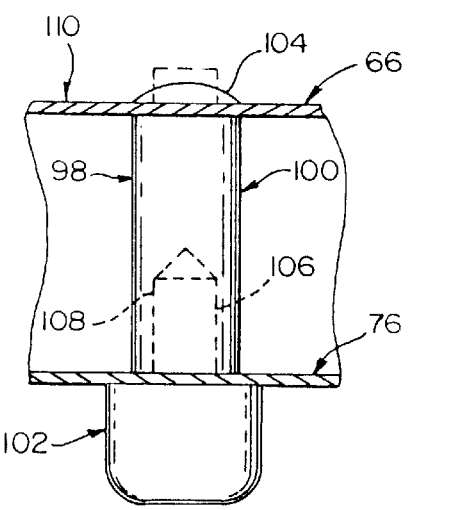
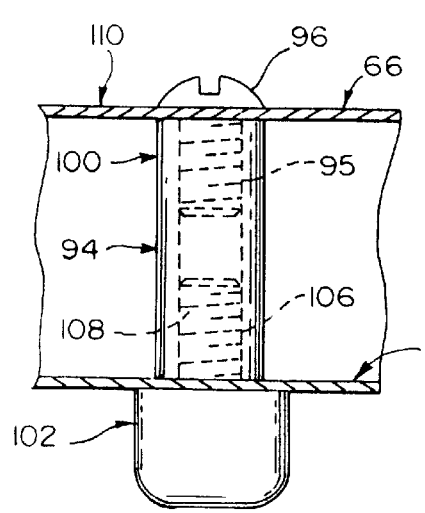

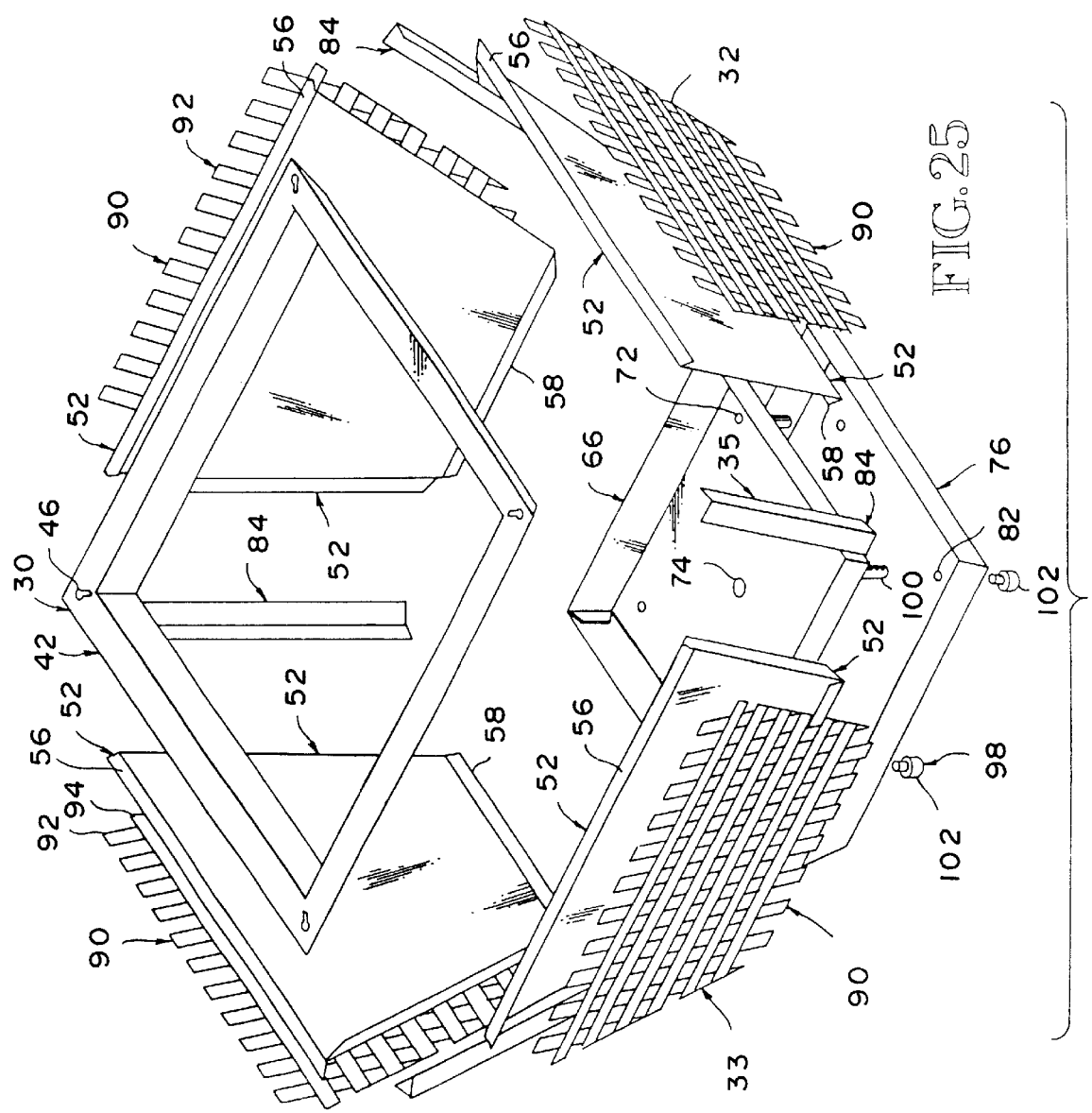

FLOWER CONTAINER WITH SELECTABLE PRESENTATION INSERTS

BACKGROUND

Flower containers, also referred to as flower boxes or flower baskets have been provided and are being provided ranging from just being a low cost quickly formed plastic, metal and/or wood container, to much higher cost containers made of various materials, which are arranged and/or formed, and/or decorated, in many, often one of a kind, artistic ways to become very beautiful flower containers.

In reference to selected U.S. Patent concerning containers to hold plants and their flowers:

In U.S. Pat. No. 1,077,423, Allen S. Myers, in 1913 illustrated and described his plant holder having an insert creating a raised bottom to support the dirt, and to allow drainage of excess moisture and water out of the dirt, while keeping this drained water within the plant holder, until it could be intentionally drained;

In U.S. Pat. No. 1,334,069, Leopold Bach and Elias Kuebler, in 1920, disclosed their flower stand having decorative corner posts, a central container for dirt having drain holes, and a separate water drip pan located at a spaced distance below the bottom of the central container;

In U.S. Pat. No. 1,951,642, Charles Augustin and Thomas P. Carroll in 1934, illustrated and described their collapsible flowerpot made of two sections, both formed out of water-proof cardboard;

In U.S. Pat. No. 4,016,676, Edward T. Bennick Jr., in 1977 disclosed his planter and method of making same. The exterior of his planter appears as a lump of earthen material, and inside is a conventional plastic container. Between the container and the earthen material, during manufacturing, a polyurethane was poured and then cured to complete the assembly of the planter;

In U.S. Pat. No. 4,091,928, Anthony J. Bernardo, In 1978, disclosed his flower planter kit. The starting kit, in the form of a box, serves as a mold for the base of the planter. The kit included a container of cement and an instruction manual;

In U.S. Pat. No. 4,847,741, Paul W. Boettinger, in 1989, illustrated and disclosed his light pole planter device. This planter, made in two mirror image shells, is arranged to be fitted about a light pole to create a dirt and plant holding volume; and In U.S. Pat. No. 4,950,216, Donald E. Weder, in 1990, disclosed his method of forming a flower pot. He formed his pot from a sheet of material, creating overlapping folds of the material. Some of the folded material created a skirt. When plants were placed in the flower pot, the skirt was extended outwardly.

These various types of products developed to hold plants all had their design purposes. Yet there remains a need for a flower basket to be very decorative, while still being reasonably manufactured, and subsequently providing the proper drainage of excess water from the dirt in which a plant is placed.

SUMMARY

To attractively display beautiful plants and their beautiful flowers, a flower container, also referred to as a flower box or flower basket, is provided, which adds to the attractiveness and beauty of the resulting overall display of the plants and flowers. Multiple metal pieces, which are easily assembled, have their surfaces selectably presented as beautiful metallic finishes, plastic coatings, plated layers and/or painted coatings. During their assembly, outside receiving spaces are created to be a picture frame assembly to conveniently receive, position and hold, surrounding selectable presentation inserts, serving, for example: as ornamentation; as art work, as literary work; as photography work; as combinations of art, literary and/or photography works; and/or as commercial informative art, literary, and/or photography work. In respect to ornamentation, for example, beautifully finished wood is arranged as a lattice.

At all times, the flower container provides an excellent accessible volume to be filled with planting soil and flowering plants. Preferably, there is a drain for excess water. Then where needed in most locations, a drain pan is preferably secured to the flower container. Preferably a wick assembly extends from the bottom down to the drip pan. Moreover, where needed, a hanger is available, thereby creating a hanging flower container, then often referred to as a hanging flower basket.

DRAWINGS

This multiple metal piece flower container, also referred to as a flower box or flower basket, having selectable presentation inserts is illustrated in the drawings, wherein.

Figure 1:
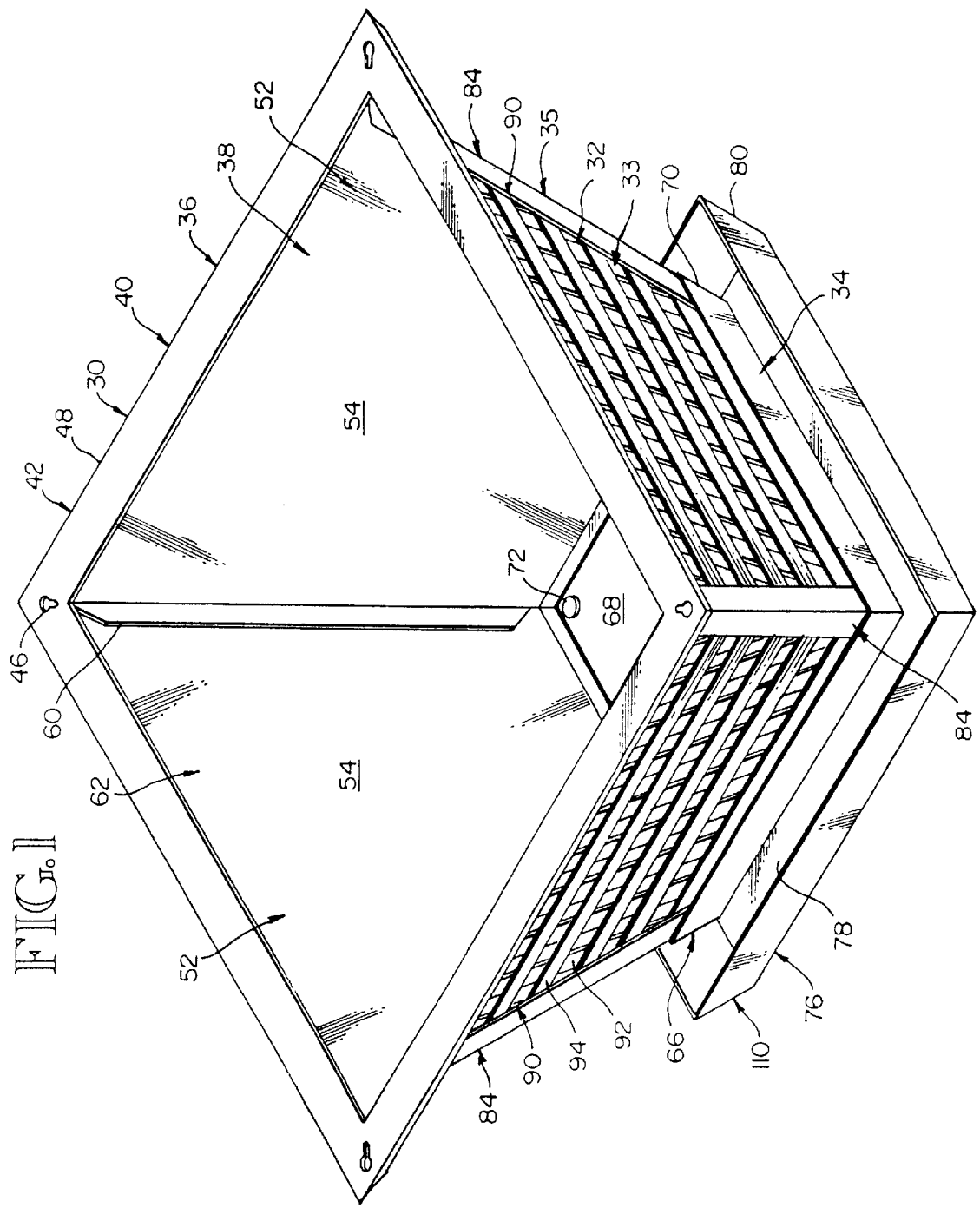
FIG. 1 is a perspective view of the assembled flower container.
Figure 2:
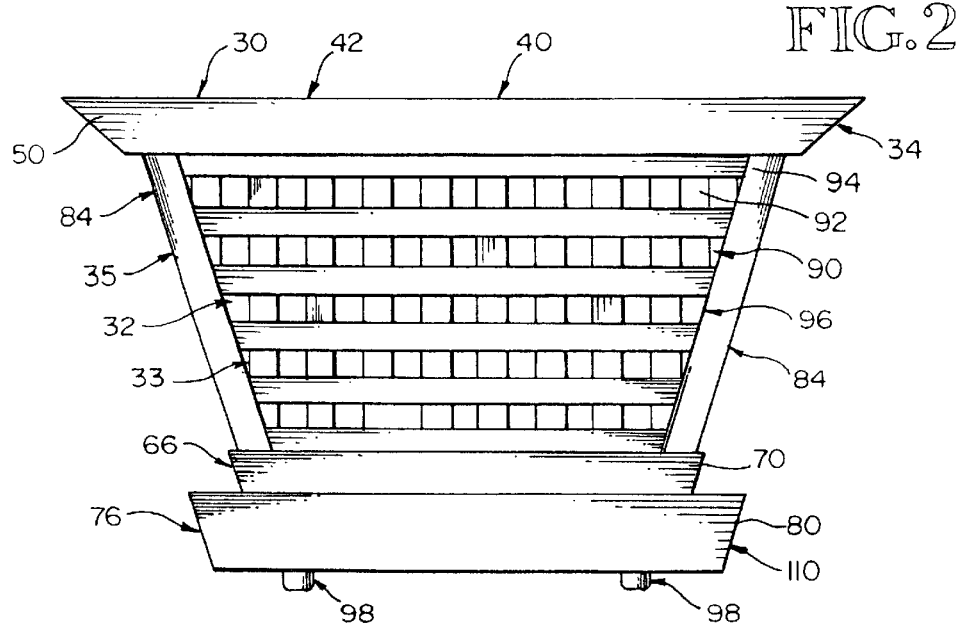
FIG. 2 is a side view of the assembled flower container, and all side views are alike.
Figure 3:
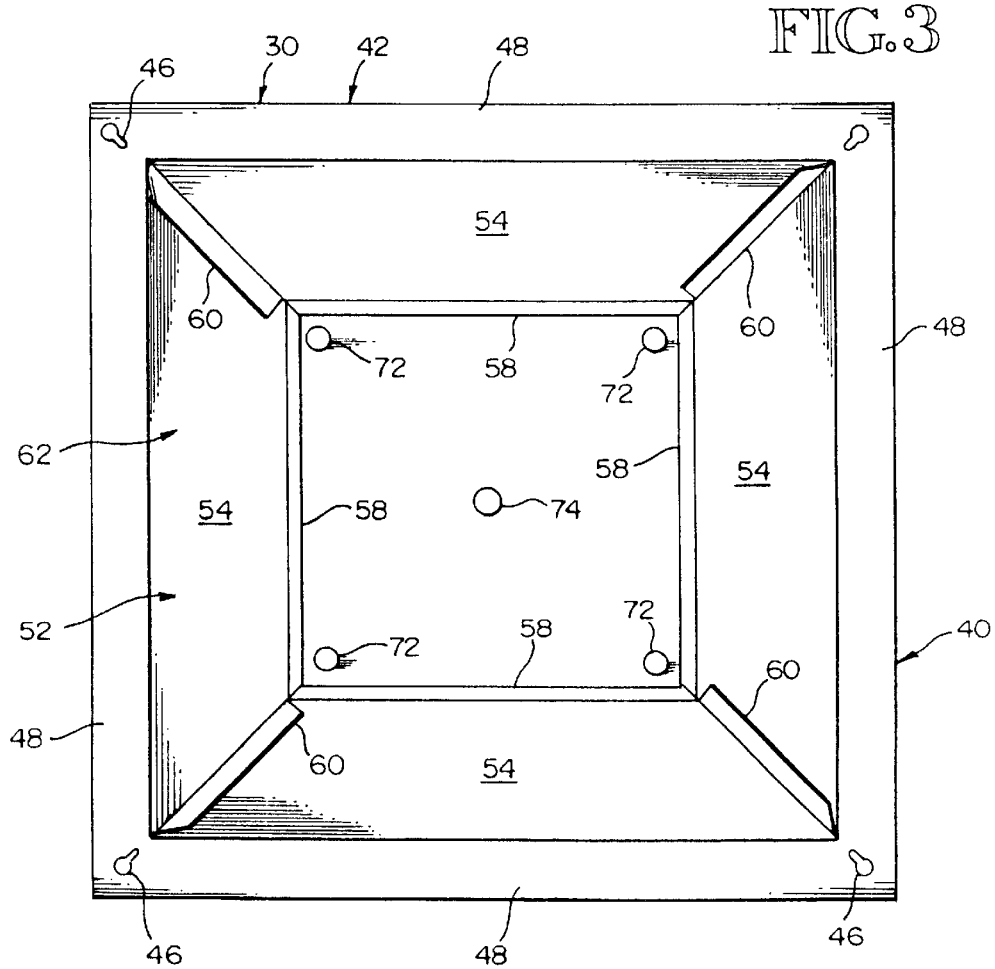
FIG. 3 is a top view of the assembled flower container.
Figure 4:
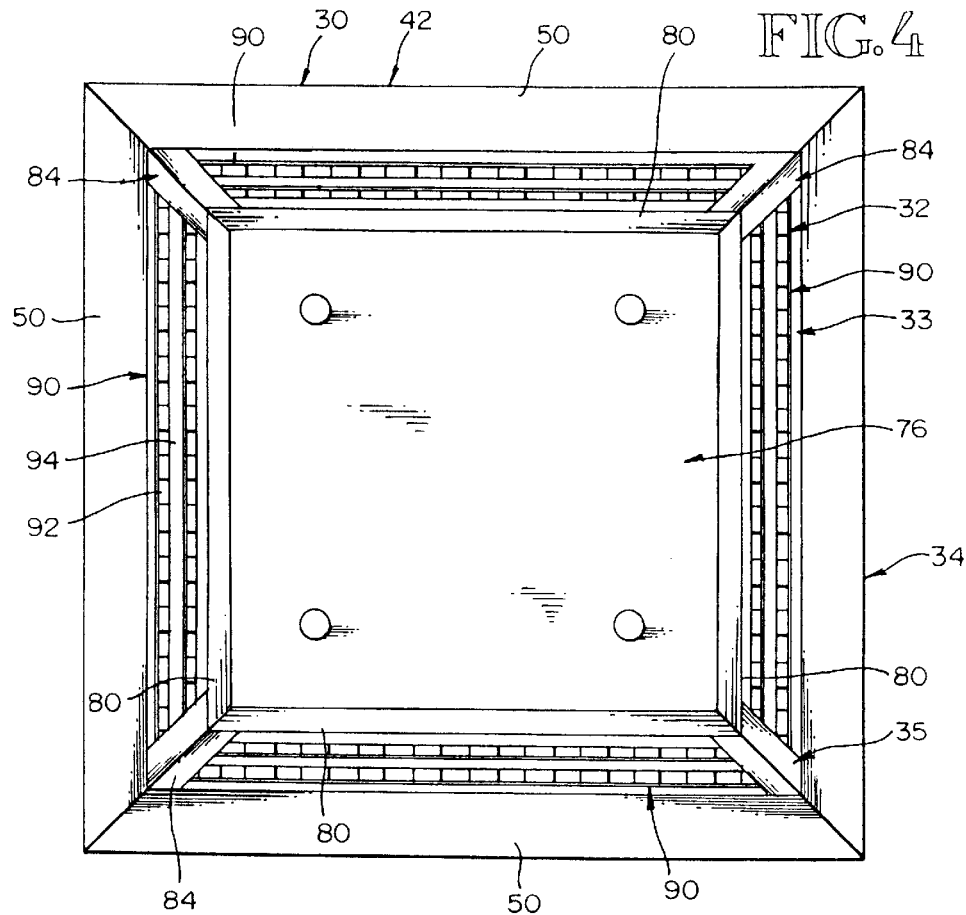
FIG. 4 is a bottom view of the assembled flower container.
Figure 5:
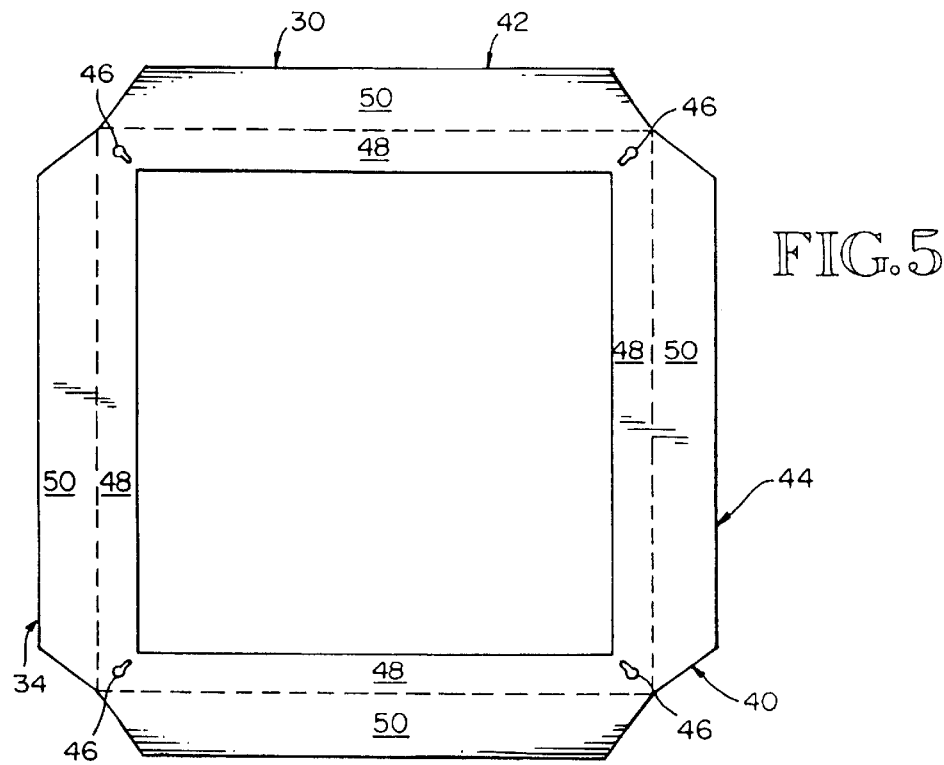
Figure 17:
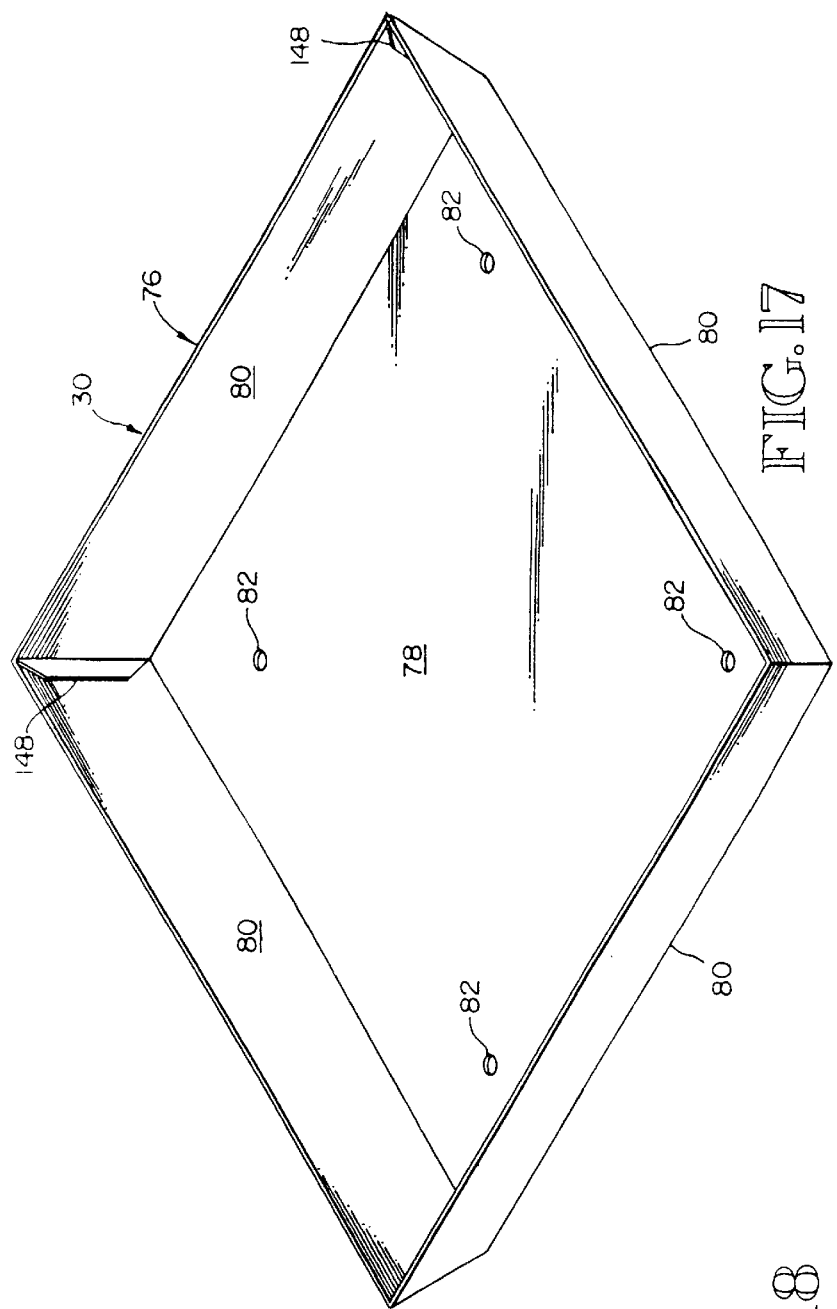
Figure 19:
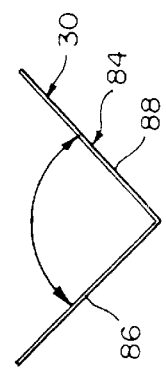
Figure 18:
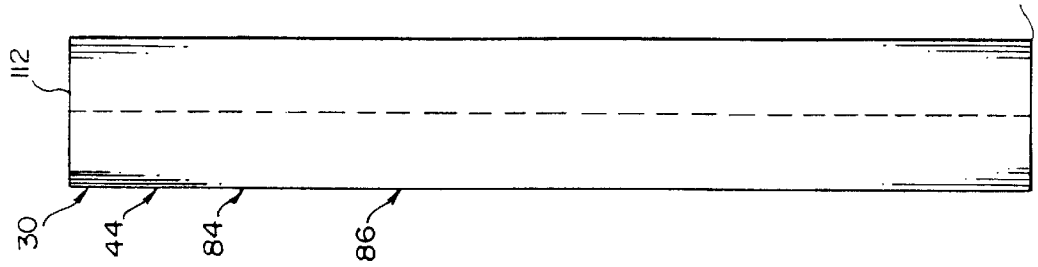
Figure 27:
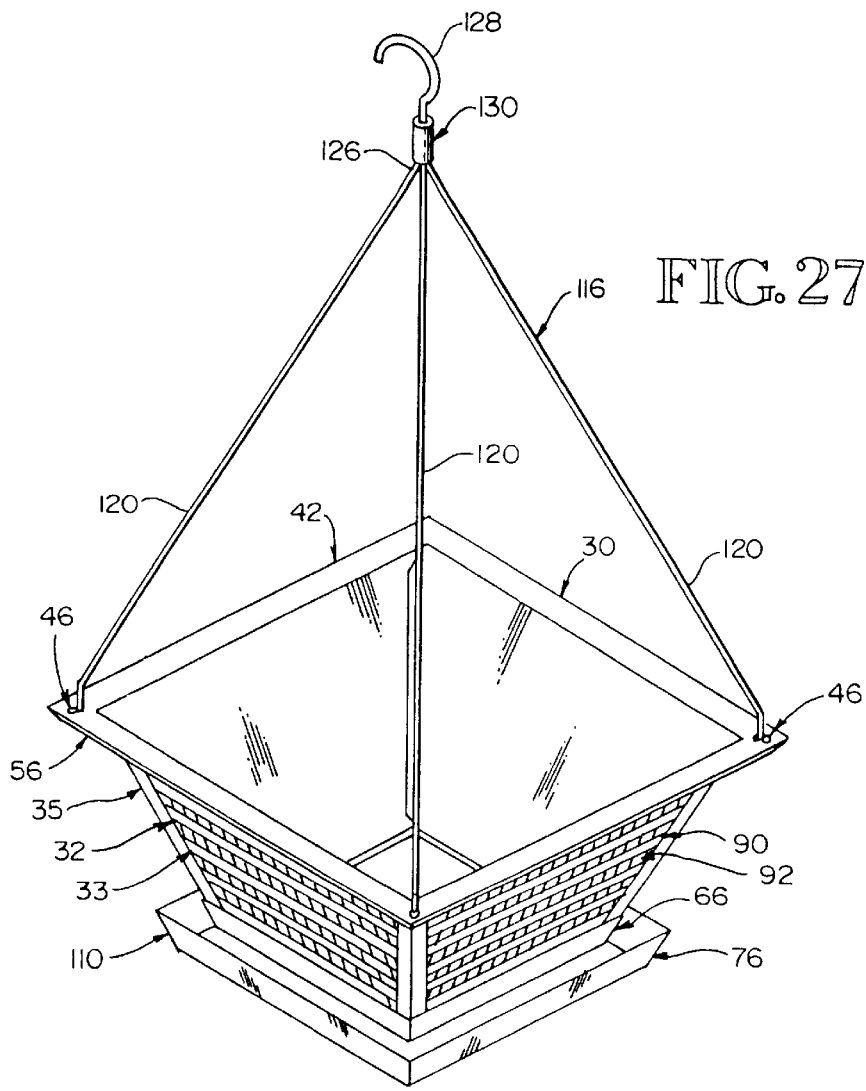
Figure 26:
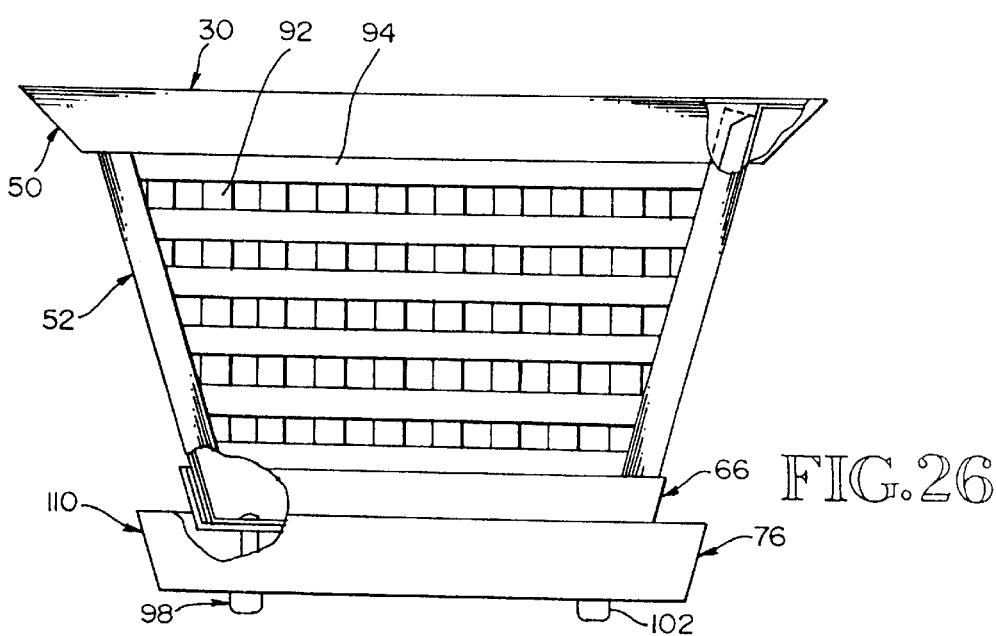
Figure 28:
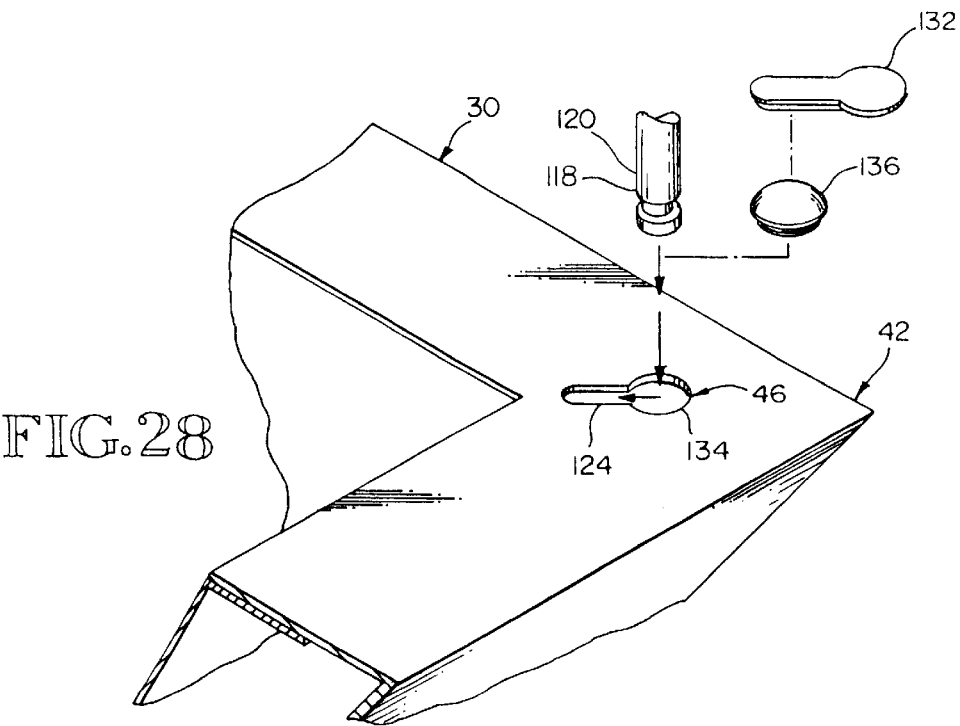
Figure 29:
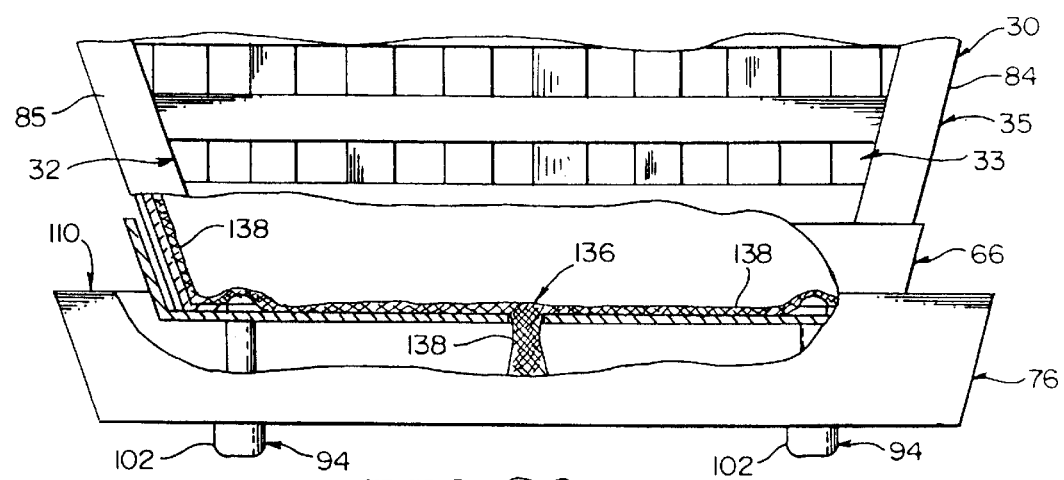
Figure 30:
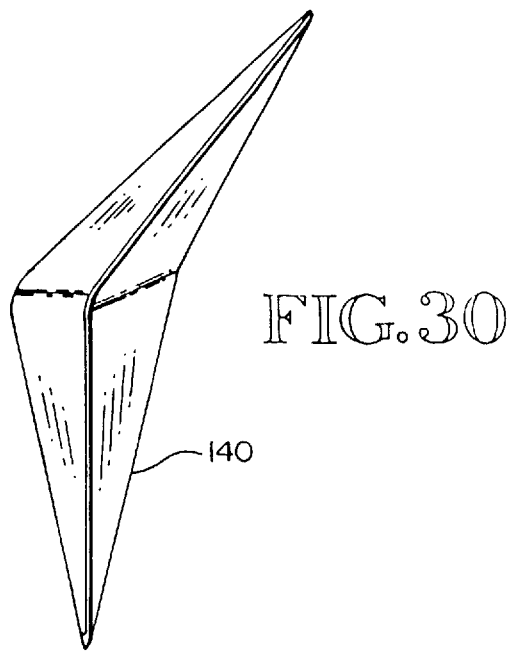
Figure 31:
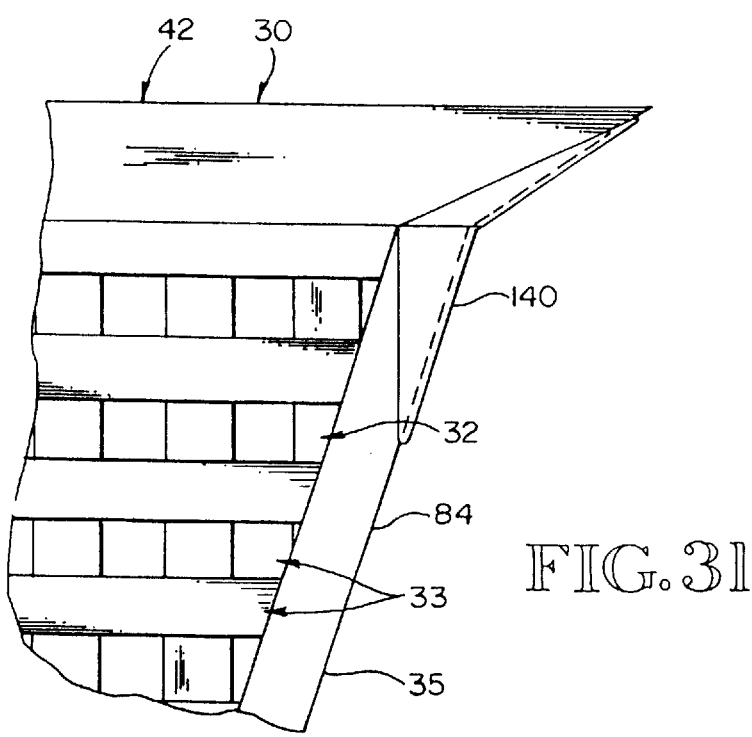
Figure 32:
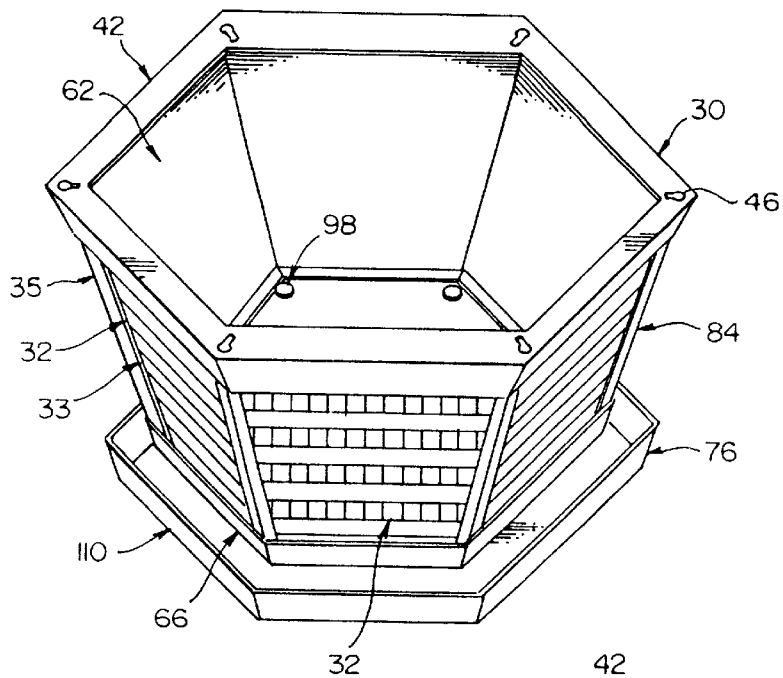
Figure 33:
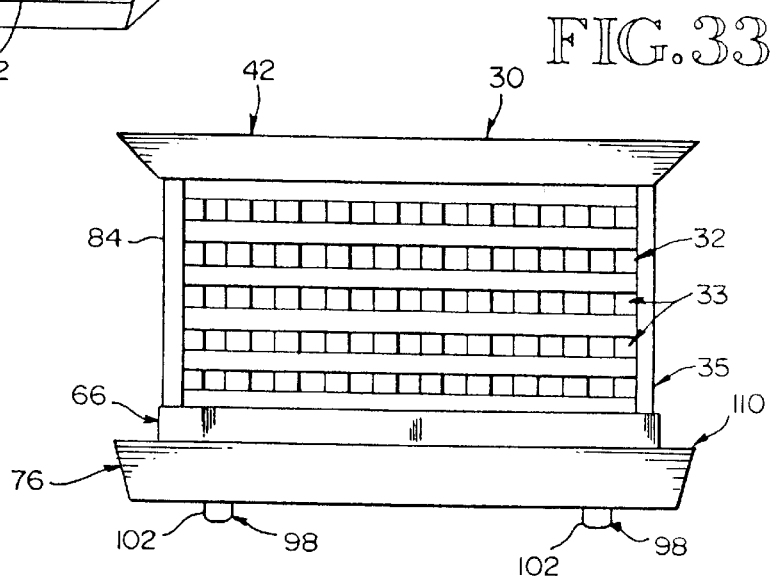
Figure 34:
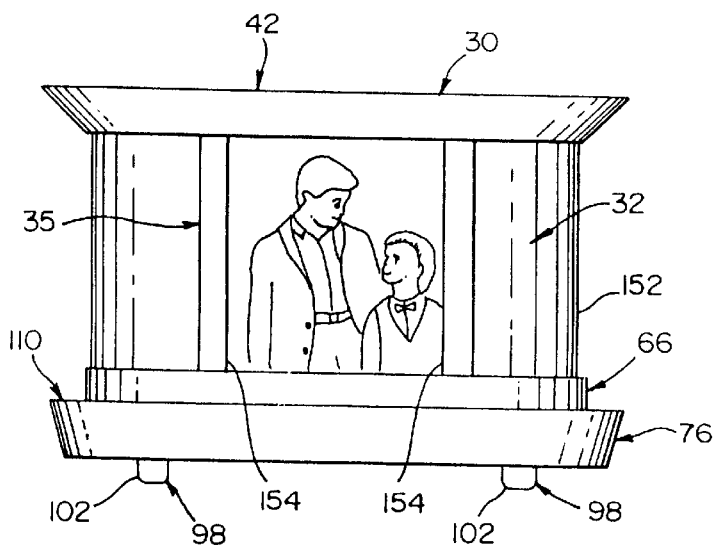

FIGS. 5, 6, 7 and 8, illustrate how the top molding is cut in FIG. 5 from a planar sheet of metal, then how it appears in a top view in FIG. 6 after being bent along the dotted lines shown in FIG. 5, and angles of the bending are indicated in FIG. 7, and the perspective view in FIG. 8 is of the completed top molding, and the keyhole like receiving cutouts shown in FIGS. 5, 6 and 8 later are used when a hanging accessory is attached to an assembled flower container;

FIGS. 9, 10 and 11, illustrate how four alike parts are made and assembled to become the overall sides, also referred to as the liner of the flower container, with FIG. 9 showing how each side is cut from a planar sheet of metal; FIG. 10 showing in a side view how the side is bent along the dotted lines presented in FIG. 9; and FIG. 11 showing in a perspective view the assembled sides; and in FIGS. 9 and 11 cutouts are illustrated at the corners, which continue on in providing the keyholes used when a hanging accessory is attached to an assembled flower container;

FIGS. 12, 13 and 14 illustrate how the bottom is made and assembled, with FIG. 12 showing how the bottom is cut from a planar sheet of metal; FIG. 13 showing in a side view how the bottom is bent along the dotted lines presented in FIG. 12; and in FIG. 14 showing in a perspective view how the completed bottom appears; and in FIGS. 12 and 14 four small holes appear which later receive fasteners, and a larger centered hole serves as an excess water drain hole;

FIGS. 15, 16 and 17 illustrate how the drip pan, which receives excess water, is made and assembled, with FIG. 15 showing how the drip pan is cut from a planar sheet of metal; FIG. 16 showing in a side view how the drip pan is bent along the dotted lines presented in FIG. 15; and in FIG. 17 showing in a perspective view how the completed drip pan appears; and in FIGS. 15 and 17 four small holes appear which later receive fasteners;

FIGS. 18 and 19 illustrate how one of four alike corner moldings are made, with FIG. 18 showing how a corner molding is cut from a planar sheet of metal; and FIG. 19 showing in a sectional view how the corner molding is bent along the dotted line appearing in FIG. 18;

FIGS. 20 and 21 illustrate how one of four alike side ornamental wood lattices are made, with FIG. 20 showing an elevational view, and FIG. 21 showing a side view;

FIGS. 22 and 23 illustrate one of four alike fastener assemblies having two parts, with FIG. 22 showing in a side view the two parts before their use; and FIG. 23 showing how the two parts are threaded together, after they are respectively positioned in reference to the bottom and also to the drip pan, which are indicated by their partial sectioned portions, and in FIG. 23, the top portion of the fastener assembly has been peened over during the securement, with the dotted lines showing the top portion before the peening has occurred;

FIG. 24 is a side view, partially in section and similar to FIG. 23, illustrating another fastener assembly which utilizes a threaded screw fastener at both the top and bottom of the spacer cylindrical threaded portion of this fastener assembly;

FIG. 25 is an exploded isometric view of the parts of the flower container;

FIG. 26 is a side view of the assembled flower container with some portions removed, for the purpose of indicating how the parts are interfitted;

FIGS. 27 and 28 show a hanger for the flower container with FIG. 27 illustrating how the hanger is secured to the top molding of the flower container utilizing the keyholes; and FIG. 28 is an enlarged partial view, partially sectioned, to illustrate how one depending leg end of four legs of the hanger is formed to interfit with one of the four keyhole receiving and holding structures of the top molding and also how a locking push in plug is inserted after the hanger is installed, or if no hanger is installed how another larger keyhole shaped filling push in plug is inserted in the keyhole of the top molding;

FIG. 29 is a partial side elevational view with portions removed and portions shown in section to illustrate how wick materials are used and distributed to insure that drained excess water is still available to be returned to the soil via the wick materials;

FIGS. 30 and 31 show how a decorative overlay is placed at each corner to cover the metal joining materials, with this overlay being illustrated in the perspective view of FIG. 30, and in the partial overall corner view of the flower container after its securement, FIG. 32 is a top perspective view of another embodiment of the flower container, which has six sides;

FIG. 33 is a side view of another embodiment of the flower container, which is square, having four sides;

FIG. 34 is an elevational view of another embodiment of the flower container, which is round, i.e. cylindrical in shape, and is used to display for example: family or other photographs, writings, art works, trademarks, etc., and between these presentation inserts a vertical molding having a curved cross section is placed to complete the framing of the presentation insert.

Figure 35:
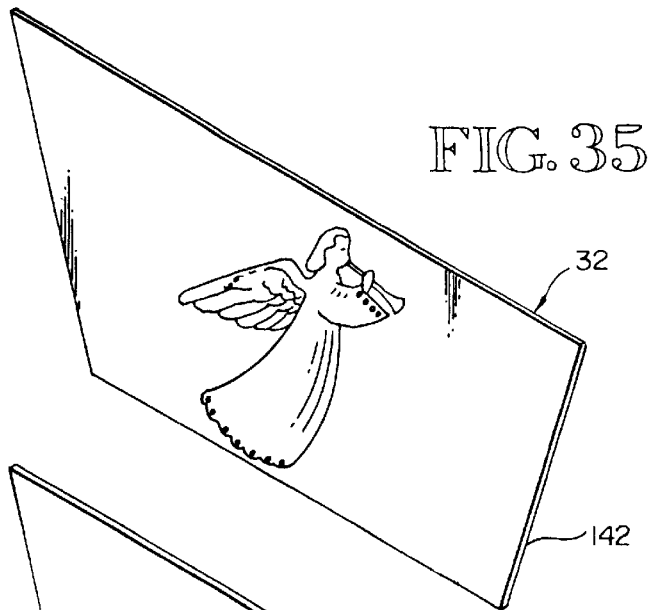
Figure 36:
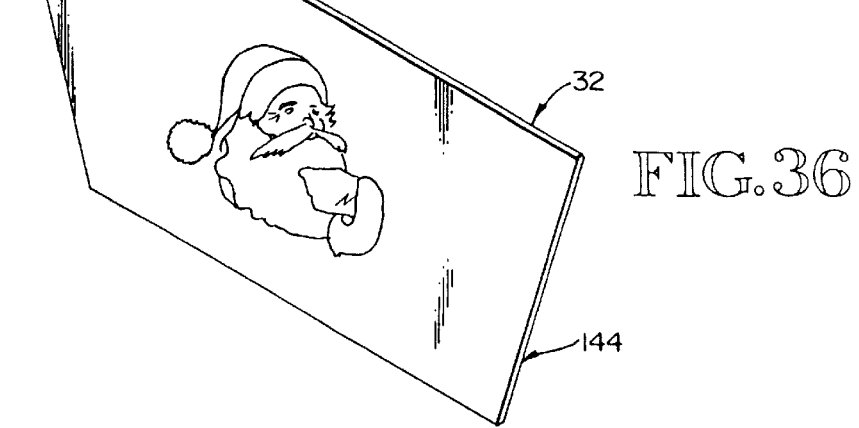
Figure 37:
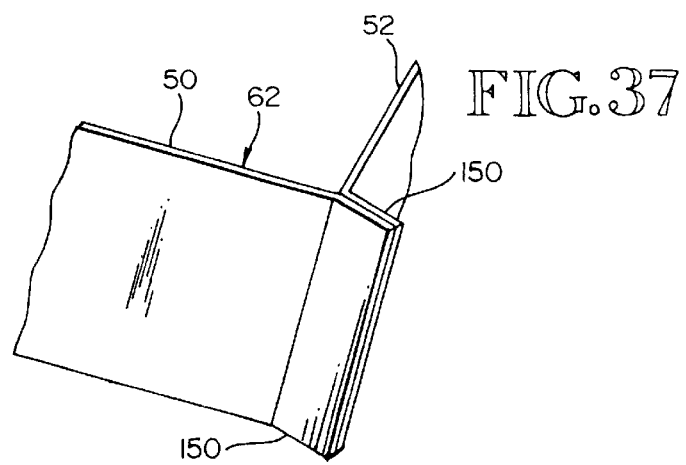

FIGS. 35 and 36 illustrate how, instead of a decorative wood lattice, an artistic presentation rendered on an insert is utilized; and FIG. 37 illustrates how the sides, for example, instead of being joined by inside overlapping tabs, may, in lieu thereof, be originally stamped to include outside positioned abutting tabs for joining them together by using a different production step.

DESCRIPTION OF A PREFERRED EMBODIMENT

Introduction

A multiple metal piece easily assembled flower container also referred to as a flower box or flower basket of beautiful metallic, plastic coated, plated and/or painted surfaces, provides outside receiving spaces serving as picture frame assemblies to conveniently receive, position and hold selectable presentation inserts, serving, for example: as ornamentation, such as beautifully finished surrounding portions of a wood lattice; as art work; as literary work; as photography work and/or as commercial information work.

At all times, this multiple metal piece flower container provides an excellent excess water drainable volume to be filled with planting soil and flowering plants to complete their decorative display, with or without utilizing a hanging accessory, and preferably utilizing a drained water drip pan, with a wick assembly extending from the bottom down to the drip pan.

The Appearance of the Flower Container

A preferred embodiment of the flower container 30 with selectable presentation inserts 32 is shown in FIGS. 1 through 37 of the drawings. This flower container 30 itself is beautiful, to in turn care for the planting and display of beautiful plants and their flowers. The selectable presentation inserts 32 are made of many materials, and serve, for example, as ornamentation, as art work, as literary work, as photography work and/or as commercial informative work. As presented in FIGS. 1, 2, 4, 20, 21, 25, 26 and 27, a lattice of wood strips 33, finished in one of several ways, serves as the presentation insert 32. During the assembly of the flower container 30, respective metal portions 34 are positioned, as a picture frame assembly 35, to collectively keep the presentation insert 32 in place. All the metal portions 40 are selectably finished: as polished metal portions 36, as painted metal portions 38, as plastic coated portions and/or as plated portions. As so arranged and finished, the flower container 30 is itself considered as art work.

The Making of the Metal Portions of the Flower Container

The making of all the metal portions 40 of the flower container 30 is described as follows:

The top molding 42, just after cutting from a planar metal sheet 44, is illustrated in FIG. 5. There are dotted lines which indicate where subsequent bending is to occur. Also at each corner location is a respective keyhole opening 46. After the bending has been undertaken, along the dotted lines, the top molding 42 appears, as a level narrower top 48, as shown in FIG. 6, when viewed directly from above. The resulting angular positions of the depending portions 50 are illustrated in partial and sectioned elevational view of FIG. 7. The isometric view of the top mounting 42 is presented in FIG. 8.

Four alike side sections 52 are shown in FIG. 9 as they are first cut from a planar metal sheet 44. As indicated by the dotted lines in FIG. 9, three portions are subsequently bent as shown in FIG. 10. With the main side portion 54 shown in its final angular position, the top bent portion 56 is bent into an outwardly projecting horizontal position. The bottom bent portion 58 is bent into an inwardly projecting horizontal position. The side edge bent portion 60 is bent to overlay the main side portion 54 of the adjacent alike side section 52. When these four alike side sections 52 are arranged together, they become the overall sides 62, also referred to as the liner 62, of the flower container 30, as illustrated in FIG. 11. At the respective ends of the top bent portion 56, there are partial larger keyhole openings 64, which subsequently during assembly of the flower container 30, continue the openings started by the keyhole openings 46 made in the top molding 42.

The bottom 66 is also cut from a planar metal sheet 44, as shown in FIG. 12. The dotted lines indicate where bends are made leaving a main bottom portion 68, and creating the upturned bottom sides 70 arranged on a bias, as illustrated in FIGS. 13 and 14. Four small alike holes 72 are made near the corners of the main bottom portion 68, to subsequently receive portions of a fastener assembly. A larger centered hole 74 is provided to drain out any excess water which later may be present when the flower container 30 is in use. Four alike integral tab portions 146 serve as overlapping joining portions during assembly and the welding operations.

Preferably, when the drainage of excess water from a flower container 30, is expected, this drained excess water is collected in a drip pan 76 which is fastened to the bottom 66. Preferably a wick assembly 77 extends from the bottom 66 down to the drip pan 76. As illustrated in FIG. 15, the drip pan 76 is cut from a planar metal sheet 44. Dotted lines show where bends are made leaving a main drip pan portion 78, and creating the upturned drip pan sides 80. Four small alike holes 82 are made near the corners of the main drip pan portion 78. These holes 82 eventually are respectively aligned with the four small alike holes 72 made near the corners of the main bottom portion 68. Four alike integral tab portions 148 serve as overlapping joining portions during assembly and the welding operations. How the drip pan 76 appears, subsequent to the bending of the upturned drip pan sides 80, is presented in FIGS. 16 and 17.

Four corner moldings 84 are cut out of a planar metal sheet 44, as illustrated in FIG. 18. A dotted line indicates where a bend is made to create the end view of a corner molding 84, as indicated in FIG. 19, having two alike size flange portions 86, 88.

Four alike outside positioned selectable presentation inserts 32 are illustrated in FIGS. 20 and 21. These inserts 32 comprise vertically spaced and horizontally spaced wood strips 90, 92, secured together, to form a lattice 33, which will overlay a respective main side portion 52 of an assembled flower container 30.

Selected four alike fastener assemblies 98 are illustrated in FIGS. 22 and 23. As indicated in FIG. 22, there are two parts 100, 102 of each fastener assembly 98. Part 100 is a cylindrical spacer determining the spaced apart distance of the bottom 66 and the drip pan 76. An upward smaller cylindrical portion 104 of part 100, during the later assembly of the flower container 30, is peened over to keep this part 100 from dropping clear of the bottom 66, in respect to a location at a hole 72. The lower portion of part 100 has a centered threaded hole 106 to receive a foot screw 102, which is the second part of each fastener assembly 98. During assembly of the flower container 30, the threaded portion 108 of the second part 102, i.e. the foot screw 102, is passed through a hole 82 in the drip pan 76, and threaded into the centered threaded hole 106, until the head 10 of this foot screw 102, i.e. the second part 102, is tightened against the main drip pan portion 78, i.e. against the drip pan 76. The installed position of each fastener assembly 98 is illustrated in FIG. 23, showing how the bottom 66 and the drip pan 76, while spaced apart, are held together by using the four fastener assemblies 98.

Another selected four alike fastener assemblies 94 are illustrated in FIG. 24. Instead of the upward smaller cylindrical portion 104 of the fastener assemblies 98, another centered threaded hole 95 is provided to receive a threaded screw 96.

Selected Metal Connection Processes, etc.

In respect to the top molding 42, the four alike side sections 52, the bottom 66, and the drip pan 76, where the bent portions are abutted together or overlay one another, they are joined by using a selected metal connecting process, such as soldering, brazing, and/or seam or spot welding. Subsequently the joints, which will later be observed when the flower container 30 is assembled, are ground, sanded, and/or polished.

The Pre and Post Assembly Positions of the Parts of the Flower Container

The relative positioning of all of the parts of the flower container 30, before their assembly, is illustrated in FIG. 25. Then in FIG. 26, how these parts are interfitted is shown, and, for illustration purposes only, various portions of parts are broken away and/or sectioned to assist in the understanding of how they are interfitted and/or joined together.

Preferred Approach to Assembling Parts of the Flower Container

During assembly, the preferred approach is to start with placing the top molding 42 upside down on a work table. Then the four alike side sections 52 have their top bent portions 56 interfitted with the depending portions 50 of the top molding 42, and the level narrower top 48 of this top molding 42.

The selectable presentation inserts 32, such as the selected four lattices 33 of wood, are positioned adjacent the respective side sections 52, and also they are inserted into the top molding 42.

Then four corner moldings 84 are positioned outside the lattices of wood 33 at the corners of the overall sides 62, i.e. the liner 62, and also they are inserted into the top molding 42.

When a drip pan 76 is not to be included, which is not preferred, the bottom 66, positioned upside down, is lowered, and in so doing, the upturned bottom sides 70 thereof overlap and thereby confine portions of the overall sides 62, the lattices of wood 33, and the four corner moldings 84, thereby completing a picture frame assembly 35. When a drip pan 76 is not to be included, the drain hole 74 and small holes 72 are not made.

When a drip pan 76 is to be included, as preferred, then the fastener assemblies 94 or 98 are utilized to assemble the bottom 66 and the drip pan 76. The part one 100 and the second part 102 of each fastener assembly 98 are arranged in respect to a hole 82, so when they are threaded together, they are gripping the drip pan 78. Then, in respect to the fastener assemblies 98, the upward smaller cylindrical portion 104 of each part one 100 is directed through a respective small hole 72 of the bottom 66. Subsequently, peening of this smaller cylindrical portion 104 completes the fastening function, as illustrated in FIG. 23. When all four fastener assemblies 38 have been secured, then the assembly 110 of the bottom 66 and the drip pan 76 has been completed. When fastener assemblies 94 are used, the threaded bolt 96 is threaded into the centered threaded hole 95, as illustrated in FIG. 24.

Thereafter, this assembly 110, after being positioned upside down, is lowered, and in so doing, the upturned sides 70 of the bottom 66 overlap and thereby confine: portions of the sides 54 which comprise the overall sides or liner 62; the lattices of wood 33; and the four corner moldings 84.

When so Assembled in This Upside Down Way, Selected Securement of Portions of Parts of the Flower Container Results in the Overall Securement of all the Parts Preferably, during this upside down assembly of all the parts of the flower container 30 at preferred selected places, the joining of metal portions is undertaken, resulting in the overall maintenance of the assembled positions of all the parts of the flower container 30. This joining is undertaken, optionally, by soldering, brazing and/or seam or spot welding, in a permanent way.

Or the joining is undertaken in part optionally by using removable fasteners. If removable fasteners are utilized in a limited way, then later, persons may partially disassemble the picture frame assembly 35 of the flower container 30, and conveniently change the selectable presentation inserts 32. Also at a later time, repair and/or refinishing of some parts of the flower container 30 may be undertaken more conveniently, when some parts are disassembled as fasteners are temporarily removed.

The Preferred Optional Arrangement to Include a Hanger for the Flower Container, Then Often Referred to as a Flower Basket The flower container 30 may be placed on a supporting surface while displaying plants and the flowers thereof, or a hanger assembly 116 of a selected design and finish may be used to suspend the flower container as a flower basket 30 from a structure. In FIG. 27, a selected hanger assembly 116 is illustrated when connected to the top molding 42 of the flower container 30. In FIG. 28 the keyhole openings 46 are shown enlarged, as they are about to receive a depending leg end 118 of one of the four legs 120. Each leg end 118 has a circular slot or recess 122, which slidably interfits with the narrower portion 124 of the keyhole opening 46. When the four legs 120, via their leg ends 118, are so connected with the top molding 42 at these corner keyhole locations, the overall selected hanger assembly 116, stays well connected to the flower container 30 serving as a flower basket 30.

This securement is further undertaken, as the respective tops 126 of the four legs 120 are secured together, as shown in FIG. 27. Preferably, a hook 128 is assembled with the respective four tops 126, and collectively, they are secured together by attaching a surrounding, gathering and holding ring 130 to all of them. Optionally, the hook 128 could be formed as an extending portion of one of the tops 126 of a leg 120.

Snap In Inserts for the Keyhole Openings

As illustrated in FIG. 28, two respective types of snap in or plug in inserts are available to fill in spaces in the top molding 42 created by forming the keyhole openings 46. When a flower container 30 is not to be arranged as a hanging flower basket 30, then a keyhole shaped snap in or plug in filling insert 132 is provided to fill the entire keyhole opening 46. When a flower container 30 is arranged as a hanging flower basket 30, then the remaining circular shaped opening 134 of the keyhole opening 46 is filled by installing a snap in or plug in circular locking insert 136, which insures the respective leg end 118 stays in place.

A Wick Assembly Extending From Bottom of Flower Basket Down and Into the Drip Pan Where a flower container 30 is to be displayed and used, and excess water is to be occasionally drained away down through the centered excess water drain hole 74 in the bottom 66, and yet this excess water must be collected, then the drip pan 76 is provided to receive and to hold the excess water. As illustrated in FIG. 29, a wick assembly 136 using water absorbing and directing cord materials 138 is arranged to extend from space locations in the bottom 66, to and through the drain hole 74, and down into the drip pan 76 at spaced locations.

When excess water is no longer draining downwardly, then a wicking action may soon thereafter occur to return some water back up from the drip pan 76 and into the bottom 66 of the flower container 30. This alternate two way water flow generally avoids any need for the intentional draining of the drip pan 76.

Decorative Overlap for Selected Metal Joining Locations

As illustrated in FIGS. 30 and 31, decorative overlays 140 are provided at selected metal joining locations to cover metal joining materials. Such a location is where the top molding corner and a top of a corner molding are joined as shown in FIG. 31.

Other Shapes of the Flower Container

The illustrated preferred embodiment of the flower container 30 has the four sides which upon assembly slant inwardly. In FIG. 32, another embodiment of the flower container 30 has six sides which upon assembly slant inwardly. In another embodiment, shown in FIG. 33, the four sides do not slant inwardly, creating a completed square flower container 30. In another embodiment, shown in FIG. 34, the flower container has a cylindrical shape. Around the circular side 152 one or more presentation inserts 32 are placed such as family or other photographs, writings, art works, trademarks, etc., and between these presentation inserts a vertical molding 154 having a curved cross section is placed to complete the framing of the presentation insert 32. In other embodiments, not illustrated, there are more, or less, sides, with sides being both slanted and not slanted, and also there are conical and triangular shapes to meet various demands of customers.

However, in respect to all these embodiments, the same types of production steps and assembly steps are generally followed. Planar pieces of metal are die cut and bent. The assembly is undertaken starting with the top molding being placed upside down on a work table. There is always the placement of outside observable selectable presentation inserts 32, such as the ornamental lattice 33 of wood strips 90, 92.

Other Selectable Presentation Inserts

The selectable presentation inserts 32 are ornamental such as the wood lattice 33. They also are stamped and embossed metals 142 displaying art work as illustrated in FIG. 35. In addition they are printed or painted art work 144 or theme art works, or commercial art work and/or photography presentations, as shown in FIG. 36.

Selective Changes in the Making of Metal Portions Such as the Four Alike Side Sections There are changes made in the making of some metal portions to accommodate different metal to metal joining construction methods. Previously illustrated in FIGS. 9, 10 and 11, a side edge portion 60 is utilized to form an overlaying tab portion 60 which is joined to an adjacent main side portion 52.

Also in FIGS. 12 and 14 a tab portion 146 is shown, which is one of four used during the assembly of the bottom 66. Then in FIGS. 15 and 17, another tab portion 148 is shown, which is one of four used during the assembly of the drip pan 76.

However, as shown in FIG. 37, especially in reference to making the four alike side sections 52, which become the liner 62, each side has respective outside tabs 150, which are mated with outside tabs 150 of respective adjacent side sections 52, and then they are quickly and conveniently seam welded together, as illustrated in FIG. 37.

Throughout All Embodiments the Purpose is to Attractively Display Beautiful Plants and Their Beautiful Flowers By utilizing excellent finishes and including selectable presentation inserts throughout all embodiments, beautiful plants and their beautiful flowers are attractively displayed by utilizing these respective flower containers 30.

I claim:

1. A flower container with selectable presentation inserts, comprising:

a. A top molding having a dependent portion;

b. A bottom molding having an up-turned portion, means for draining plant water, and means for connecting a drip pan to the bottom molding wherein said bottom molding can not act as the drip pan;

c. A liner extending between the top molding wherein the dependent portion of the top molding overlaps the liner and the bottom molding wherein the up-turned portion of the bottom molding overlaps the liner and wherein said bottom molding is removably attached to the liner; and d. At least two corner moldings spaced apart from the liner and held in place between the dependent portion of the top molding and the up-turned portion of the bottom molding wherein the selectable presentation insert is held in place against the liner by being inserted between the liner and the two corner moldings, the dependent portion of the top molding, and the up-turned portion of the bottom molding.

2. The flower container as claimed in claim 1 further including a drip pan attached to the bottom molding for collecting plant water.

3. The flower container as claimed in claim 1 further including a hanger assembly secured below to the top molding and above terminating in a subassembly to be supported in an overhead structure.

4. The flower container as claimed in claim 1 wherein the top molding has spaced keyhole openings and further including a hanger assembly having depending legs in a like number to match the number of keyhole openings wherein each depending leg ends in a bottom formed portion to fit within one of the respective keyhole openings and these depending legs at the tops thereof are joined together becoming a subassembly to be supported by an overhead structure, and thereby support the flower container then serving as a hanging flower basket.

5. The flower container as claimed in claim 2 wherein one of the selectable presentation inserts is made of wood.

6. The flower container as claimed in claim 2 wherein one of the selectable presentation inserts is a lattice.

7. The flower container as claimed in claim 2 wherein one of the selectable presentation inserts is composed of wood strips.

8. The flower container as claimed in claim 2 wherein one of the selectable presentation inserts is a wood lattice.

9. The flower container as claimed in claim 2 wherein one of the selectable presentation inserts is an artistically embossed metal insert.

10. The flower container as claimed in claim 2 wherein one of the selectable presentation inserts is a work of art.

11. The flower container as claimed in claim 2 wherein one of the selectable presentation inserts is a photographic work.

12. The flower container as claimed in claim 2 wherein one of the selectable presentation inserts is a literary work.

13. The flower container as claimed in claim 2 wherein one of the selectable presentation inserts is a commercial informative work.

14. The flower container as claimed in claim 2 wherein one of the selectable presentation inserts is a combination of pictorial work and reading work.

15. The flower container as claimed in claim 2 wherein the liner comprises a continuously curved overall surface.

16. The flower container as claimed in claim 2 wherein the top molding, the bottom molding and the liner are all constructed of sheet metal.

17. The flower container as claimed in claim 2 further comprising connection means having a first portion and a second portion, wherein the first portion connects the bottom molding to the liner and the second portion connects the drip pan to the bottom molding.

* * * * *